United States Patent
Quilter et al.

(10) Patent No.: US 7,142,154 B2
(45) Date of Patent: Nov. 28, 2006

(54) TIME AND FREQUENCY SYNCHRONIZATIONS OF EQUIPMENT AT DIFFERENT LOCATIONS

(75) Inventors: Timothy John Quilter, Salisbury (GB); David Sherry, Alresford (GB); Robert John Weedon, Romsey (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 10/498,896

(22) PCT Filed: Jan. 10, 2003

(86) PCT No.: PCT/GB03/00075

§ 371 (c)(1),
(2), (4) Date: Feb. 23, 2005

(87) PCT Pub. No.: WO03/058863

PCT Pub. Date: Jul. 17, 2003

(65) Prior Publication Data

US 2005/0147196 A1     Jul. 7, 2005

(30) Foreign Application Priority Data

Jan. 10, 2002   (GB) ................................ 0200484

(51) Int. Cl.
*H04B 7/19*     (2006.01)
(52) U.S. Cl. ................ 342/357.06; 342/356; 455/13.2
(58) Field of Classification Search ............... 342/356, 342/357.01, 357.06; 701/207, 213; 455/12.1, 455/13.2
See application file for complete search history.

(56) References Cited

U.S. PATENT DOCUMENTS

| | | | |
|---|---|---|---|
| 4,509,200 A | | 4/1985 | Luginbuhl et al. |
| 5,510,797 A | | 4/1996 | Abraham et al. |
| 5,650,981 A | * | 7/1997 | Jacobsen et al. ............... 367/19 |
| 5,757,786 A | | 5/1998 | Joo |
| 5,861,842 A | * | 1/1999 | Hitch et al. ............ 342/357.15 |
| 6,587,079 B1 | * | 7/2003 | Rickard et al. ............. 342/387 |
| 6,674,730 B1 | * | 1/2004 | Moerder ...................... 370/316 |
| 2005/0001742 A1 | * | 1/2005 | Small ........................ 340/988 |

FOREIGN PATENT DOCUMENTS

| | | |
|---|---|---|
| WO | WO 94 14251 A | 6/1994 |
| WO | WO 99 50985 A | 10/1999 |

\* cited by examiner

*Primary Examiner*—Dao Phan
(74) *Attorney, Agent, or Firm*—Crowell & Moring LLP

(57) ABSTRACT

Method and apparatus for providing accurately synchronized timing signals at mutually distant locations employs a GPS or similar receiver at each location. These receivers are interconnected by a communications network, and exchange data over the network to agree a common timing reference.

10 Claims, 2 Drawing Sheets

Carrier phase information (dynamic size- one entry per satellite and per GPS frequency)

Pseudo-range information (fixed size)

Carrier phase information (dynamic size- one entry per satellite and per GPS frequency)

Bias prediction information (fixed size)

TIME AND FREQUENCY SYNCHRONIZATIONS OF EQUIPMENT AT DIFFERENT LOCATIONS

BACKGROUND OF THE INVENTION

Many advances have recently been made in the field of providing accurately synchronised time signals at dispersed locations. One particularly significant development has been the deployment of GNSS satellite navigation systems such as GLONASS and GPS. Other similar systems could be employed, where available. For brevity, references herein to "GPS" should be understood to include all such similar satellite navigation systems, including those employing so-called "pseudolites", that is to say, ground-based transmitters which emit signals similar to those emitted by satellites of a satellite navigation system, and whose signals are interpreted by GPS receivers as if they came from a satellite of the GPS system.

Timing devices commonly known as GPS-Disciplined oscillators, or even GPSDOs, are well known. For example, U.S. Pat. No. 5,757,786 discusses an example, as do various reports of the UK's National Physical Laboratory, for example the articles by J. Davis and J. M Furlong in the 8th International Conference on Electromagnetic Measurement, 4–6th Nov. 1997, p. 11–1; NPL Report No CTM 1, October 1997, 11th European Frequency and Time Forum Neuchatel, 4–6th Mar. 1997, p. 515–520; and Proceedings 13th European Frequency and Time Forum, 13–16 Apr. 1999, Besancon, p. 291–295. These and other relevant publications are listed at www.npl.co.uk/time/public.html.

The time signals sent by GPS satellites are very stable, over a relatively long period of time. Each GPS satellite carries a very stable frequency reference, such as a Caesium atomic clock. However, various factors such as path length, multiple paths and atmospheric conditions cause the time signal as received at a terrestrial receiver to show apparent short-term drift. The GPSDO addresses this problem by providing a local oscillator which is very stable in the short term, but may show some drift over a longer term. This clock is compared to a received GPS time signal at regular intervals, and adjustments are made to the local oscillator signal to bring it into synchronization with the GPS time signal. This is known as 'disciplining the oscillator to the GPS signal', and the oscillator is said to be "GPS-disciplined". Since the GPS signal is very accurate over a relatively long time scale, this disciplining prevents any drift in the local oscillator, while the local oscillator provides an accurate and stable timing signal which is free-running between GPS disciplining actions.

Such a GPS-disciplined oscillator can provide sub-microsecond accuracy, typically to the order of ±100 ns. Two independent GPSDOs placed at mutually distant locations could be expected to provide timing signals which differ only by around 100 ns. Such accuracy could otherwise only be produced by use of a very accurate, and hence very expensive, local oscillator.

A known GPS-disciplined frequency reference, such as the FLUKE 910/910R, is intended to produce very stable output frequencies along with an indication of real time (GPS Time), and optionally also of geographical position (GPS Position). Typically, such devices provide a time accuracy of 100 ns. Some devices are capable of an accuracy of 20 ns, but only under limited environmental conditions. The stability of the frequency and time outputs is derived from a combination of a stable clock, such as a Caesium atomic clock, carried on each GPS satellite, with a stable internal oscillator such as an oven controlled crystal oscillator or a rubidium standard which is disciplined to incoming GPS signals representing the GPS satellite's atomic clock. Such equipment typically provides a one-pulse-per-second (1 PPS) output. This 1 PPS signal is used to discipline the internal oscillator, which in turn produces at least one stable output frequency (Freq). These stable output frequencies are typically 10 MHz or 5 MHz, but other frequencies could be provided if required.

In present high-precision timing applications such as telecommunications and high accuracy multi-lateration, it is often required to provide synchronised timing signals at remote locations to within ±1 ns. Such accuracy is not possible with the GPSDO alone.

International Patent Application WO 01/61426 describes a method and apparatus used to address this problem. In that document, there is proposed a system having multiple GPS receivers at mutually distant locations. Each of these GPS receivers is connected to a central processor system. The central processor system receives timing signals from each of the GPS receivers. The central processing system then calculates the offsets between the various GPS receiver time signals, and stores values for these offsets. When one wishes to make use of the timing signal from a particular GPS receiver, the central processing system applies its calculated timing offset to the timing signal received from the GPS receiver in question, and supplies the resulting corrected timing as the output of the GPS receiver. The system described does not cause the various GPS receivers to be synchronised—"disciplined"—together, but simply tracks the timing offsets of each receiver. The system is also relatively cumbersome, in that the system needs to be provided with a central processing unit, each of the several GPS receivers needs to be connected to a central processing unit, and each request for time information must be made through the central processing system.

International patent application WO 99/63358 discloses a system of networked GPS receivers. The receivers communicate in order to generate a location estimate of increased accuracy. All of the GPS receivers are synchronised to GPS time. However, no attempt is made to improve the accuracy of synchronisation beyond the 20–100 ns accuracy which is normally produced by such arrangements.

SUMMARY OF THE INVENTION

The present invention addresses some of the difficulties presented by the known systems. In particular, the invention seeks to provide methods and apparatus for synchronising the time signals at mutually distant locations, without the need for a central processing system, and in a manner which allows simple addition and removal of equipment at further locations without upsetting the operation of the equipment at the locations remaining in the system.

According to the present invention, there is provided apparatus for providing synchronization of equipment located at a number of mutually remote locations, comprising a frequency reference associated with each of the remote locations; and a network interconnecting the disciplined frequency references, whereby the frequency references are operable to exchange information between themselves over the network, thereby to calculate a common time reference.

At least one of the frequency references is preferably operable to provide at least one frequency output, which may be a one-pulse-per-second output. The frequency outputs at at least two mutually remote locations are preferably disciplined together. Each frequency reference may further comprise means for calculating the offset(s) between respective frequency signals, and means for applying corresponding synchronisation to the equipment in response to calculated offset(s).

Each disciplined frequency reference may further comprise means for calculating the offset(s) between respective frequency signals, and means for applying a delay to an output signal (32) for compensating the offset(s).

One of the disciplined frequency references may be denoted as master, the remaining disciplined frequency references then being denoted as slave. The frequency references are then operable to adapt the timing of the master as the common time reference. The master disciplined frequency reference may be arranged to follow GPS time.

The apparatus may be arranged to apply a relative delay to the frequency signal of each slave, thereby to bring the timing of each slave into synchronisation with the master.

The present invention also provides a method for providing synchronized timing signals at mutually remote locations, comprising the steps of providing a satellite navigation system receiver at each location; providing a frequency reference at each location; providing a frequency output signal from each frequency reference to control circuitry at each location; and, in the each of a plurality of the mutually remote locations, receiving, in the control circuitry, time data from the corresponding satellite navigation system receiver and further sets of time data from at least one other remote locations over a communications network; calculating a common reference time based on the received sets of time data; and applying a delay to the timing signal of at least one of the locations, thereby bringing the frequency output signals into synchronisation. The method may further comprise the steps of appointing one of the locations 'master', and the remainder 'slave'; delaying the frequency output signals of each slave, to bring such signals into synchronisation with a corresponding frequency output signal of the master.

Other objects, advantages and novel features of the present invention will become apparent from the following detailed description of the invention when considered in conjunction with the accompanying drawings.

DETAILED DESCRIPTION OF THE INVENTION

Figure 1:
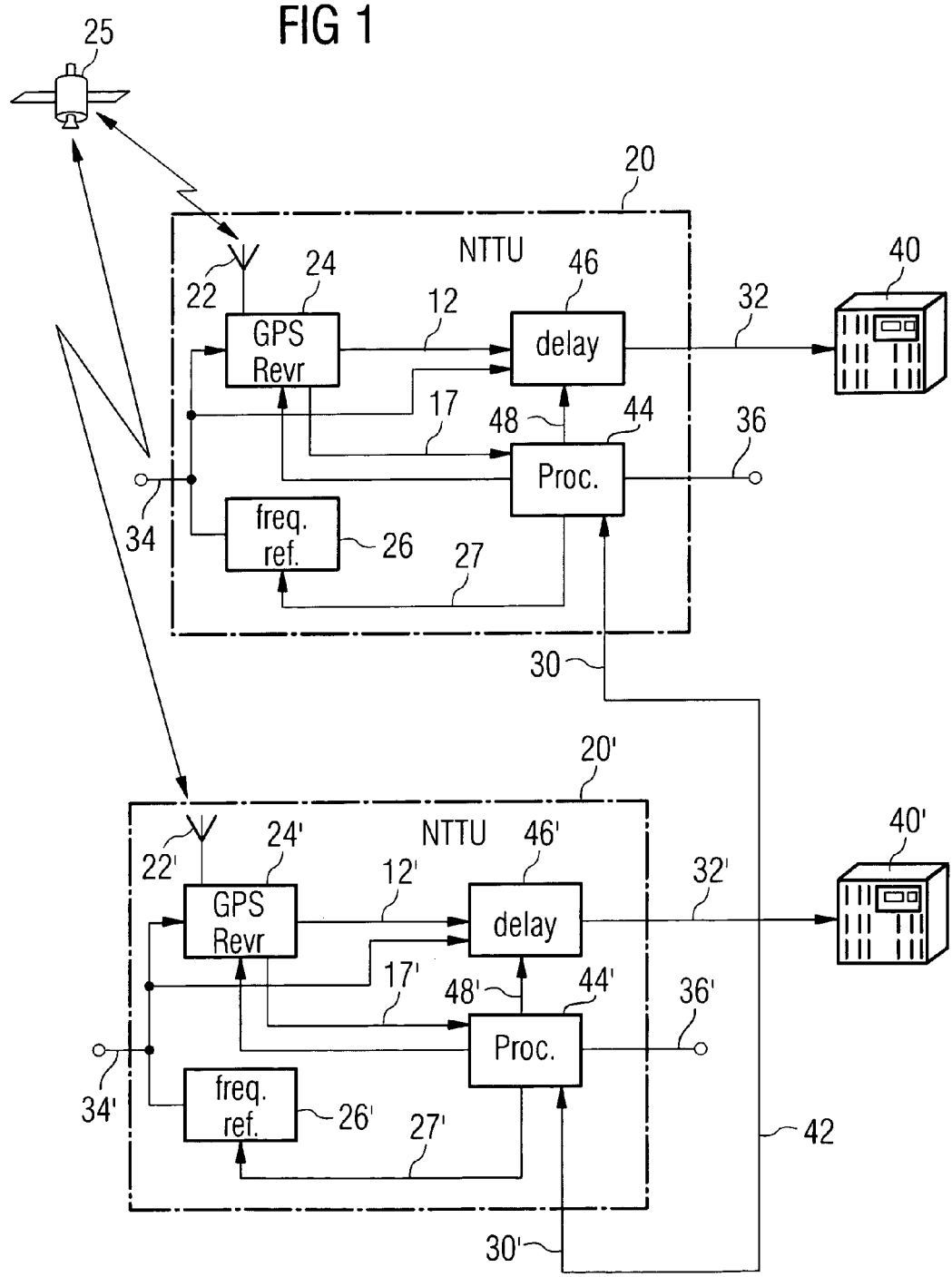
FIG. 1 schematically shows a network time transfer unit according to an aspect of the present invention.

FIG. 1 shows key blocks within a system according to the invention, including a plurality of network time transfer units ("NTTU") 20, 20' according to another aspect of the present invention. The networking capability of the NTTU 20 of the present invention allows a number of such units to be disciplined together, to achieve very accurate synchronisation of equipment 40, 40' at mutually distant locations. Accordingly, the invention provides methods and apparatus for operating time and frequency references which are at mutually remote locations, but which provide time and frequency signals synchronised much more closely than for known GPSDO devices. This is important for various applications in the field of high-precision timing applications such as telecommunications and high accuracy multi-lateration. Synchronised time signals are useful for measuring the time of arrival of a signal from a single transmitter at different locations. The position of a transmitter may be accurately determined by determining the respective times of arrival of the signal at a number of accurately synchronised receivers.

In particular, the present invention provides that any number of NTTUs 20 as illustrated in FIG. 1 may be interconnected by a network 42, and that they will calculate a common time reference, referred to in this description as "ensemble time" by mutual disciplining. Typically, the timing signals for the mutually remote equipment 40, 40' will be synchronised with each other to within ins. The various time and frequency signals produced by the NTTUs will typically all be synchronised to within ins of each other, and will also be synchronised to incoming GPS time as accurately as a conventional GPSDO. Each NTTU receives time signals from GPS satellites 25, which are decoded by the NTTU's GPS receiver 24. The GPS data is provided to algorithms in control processor 44, along with corresponding information from other NTTUs over network 42, and ensemble time is updated to take all of this data into account.

FIG. 1 illustrates a system according to the present invention in which two NTTUs 20, 20' are each connected to one of a number of pieces of equipment 40, 40', which need to be synchronised together. The pieces of equipment 40, 40' are at mutually distant locations.

Referring to FIG. 1, an NTTU 20 includes a GPS receiver 24 connected to a suitable GPS antenna 22. The GPS antenna 22 receives signals from a number of GPS satellites 25, as is well known, and these signals are received and interpreted by the GPS receiver 24. The GPS receiver 24 produces a 1 PPS output 12, and also a data output 17, as is usual. The data output 17 contains information such as location data and time-of-week data, as is also usual. A frequency reference 26 is also provided. This typically takes the form of a stable oscillator, such as a rubidium standard or an oven controlled crystal oscillator, disciplined to maintain accurate reference frequency 34 for accurate 1 PPS by disciplining control signal 27 as calculated by algorithms of control processor 44. The frequency reference 26 also provides a reference frequency 34 to the GPS receiver 24 and a delay block 46. The purpose and functionality of delay block 46 will be further described below. The frequency reference 26 may also provide the reference frequency 34 as an output signal.

NTTU 20 is provided with a network connection 30, for communicating with other NTTUs 20' over a network 42, according to an aspect of the present invention. Typically, the network exchanges raw GPS data between the NTTUs. The control processor 44 collects GPS data 17 from the GPS receiver 24, and from the other NTTUs over network 42, and uses this data to work out 'ensemble' time for itself. A corresponding operation takes place in each NTTU 20, 20'. The data transmitted over the network may include further data for improved accuracy. An example of suitable algorithms will be discussed below.

All NTTUs 20, 20' receive all data and calculate the 'ensemble' time individually. Each NTTU receives the same information, being GPS data from its own receiver 24 and GPS data from other locations over the network 42. Each NTTU uses the same algorithm. Each NTTU thereby calculates an identical 'ensemble' time. The ensemble time calculated by the various NTTUs typically correspond to within 1 ns.

Features of second NTTU 20' corresponding to features of NTTU 20 have corresponding, but primed, reference numerals.

The NTTUs 20, 20' are each in view of a common GPS satellite 25. This is essential, since it ensures that the GPS data received by each of the NTTUs 20, 20' is consistent. The present invention allows for any number of NTTUs to be interconnected over the network 42. However, it is not necessary for all of the NTTUs in the system to have a common view of a single satellite 25. Using a system of three NTTUs, for example, labelled 'A', 'B', and 'C', it is sufficient for NTTUs A and B to have a common view of satellite 1 while NTTUs B and C have a common view of satellite 2, even though NTTU A has no view of satellite 2 and NTTU C has no view of satellite 1. Since NTTU B has a view of both satellites, it can derive, and compensate for any deviation in the timing data from the two satellites. This principle may be expanded to cover systems having any number of NTTUs. As a minimum requirement, groups of at least two NTTUs (hereinafter referred to as 'pairs') must share a common view of at least one satellite 25. Each NTTU must be a member of at least one pair, and a sufficient number of NTTUs must have view of at least two of the satellites, that is to say must be a member of at least two pairs, for any deviation in the timing data of the satellites to be detected, and compensated for.

A typical embodiment of the present invention will include NTTUs 20, 20' spaced at separate locations. The invention has been tested on NTTUs spaced about 400 km apart. The largest possible area over which the time synchronisation of the present invention may be installed is limited only by the requirement that all locations are included in at least one pair of locations 20 20', each member of each pair having a common view of at least one GPS satellite 25. If more than one common satellite 25 is available, the NTTUs 20, 20' of that pair must decide amongst themselves, by exchange of data over the network 42, which satellite they will use as a reference.

The following part of this description describes the apparatus and method which may be used to synchronise the 1 PPS outputs 32 of the various NTTUs 20. However, the described methods may be used in analogous fashion to synchronise other frequency outputs, such as a 5 MHz or 10 MHz output. The following part of the description should accordingly be interpreted as including also the synchronisation of such other frequency outputs.

The control processor 44 of each NTTU 20, 20' calculates an accurate time offset between the GPS data 17 provided by its own GPS receiver 24 and the GPS data from each of the other NTTUs as received over the network 42, using differential timing algorithms described later. The control processor 44 then combines this data with the approximate standalone timing error of each NTTU relative to GPS system time to produce the ensemble reference time. The calculated difference between the local time of the NTTU and the ensemble system time is used to apply an accurate real time correction to the 1 PPS 32 (or a similar timing signal) by control 48 of delay block 46. The rate of change of the local NTTU time relative to the computed ensemble system time is used to discipline the frequency reference 26 by disciplining control signals 27.

Each NTTU uses common GPS data and algorithms so that the ensemble reference time computed by each NTTU will be the same. The combination of the disciplining of the frequency reference 26 and the delay 46 applied to the 1 PPS output 32 at each NTTU 20 results in the outputs 32, 32' of each NTTU being synchronised with each other to within 1 ns.

The 1 PPS signals 32 from each of the NTTUs 20 are brought into synchronisation by delay block 46 which itself may operate according to any one of a number of methods, known in themselves.

An analogue technique may be employed, such as a voltage ramp and threshold device, measuring a voltage across a capacitor-resistor network being charged or discharged, from a constant current source. Such circuits have achieved an accuracy of 20 ps but are prone to variation, for example, with over-temperature.

Mixed analogue/digital techniques may also be used. For example, a combination of fine analogue ramps with coarse digital clocks, such as an HP53132 Universal counter front end, which employs a capacitor-resistor voltage ramp charge or discharge circuit timed by digital clocks.

Alternatively, purely digital techniques may be employed. For example, by sampling at a given rate and applying digital delay. The granularity is dependent on the clock rate. Digital techniques have the advantages of being accurate to within one clock period, and are dependable over time.

In alternative embodiments, the output signals 32 may not in fact be disciplined to ensemble time, and accordingly also in synchronisation with the corresponding outputs of other NTTUs. Instead, NTTU 20 according to the present invention may simply measure the offset between its signal 32 and the reference, 'ensemble', time, communicate data representing this offset to the associated equipment 40, which can take the offset into consideration. In this case, delay block 46 is not used, but the control signal 48 operating it may be sent to the equipment 40 as an indication of the offset.

One significant advantage of the infrastructure of the present invention is that it is portable and easily reconfigurable. Network connections 42 need to be made between the various NTTUs, but otherwise the system is modular, and individual NTTUs may be added or removed at will. The network 42 could be embodied as radio communications channels, or other wireless communications means.

The system and methods of the present invention may also be employed to assist in the production of real-time kinematic surveys. As is well known to those skilled in the art, real-time kinematic survey is a differential GPS process where carrier-phase corrections are transmitted in real time from a reference receiver to one or more remote receiver. As the system and method of the present invention provide for the exchange of GPS data between the various locations, it is a simple procedure to complete the real-time Kinematic survey.

An example of algorithms that may be embodied and used within the control processor 44 will now be described. The following description substantially corresponds to the description of algorithms used for a similar purpose in WO 01/61426.

Figure 2:
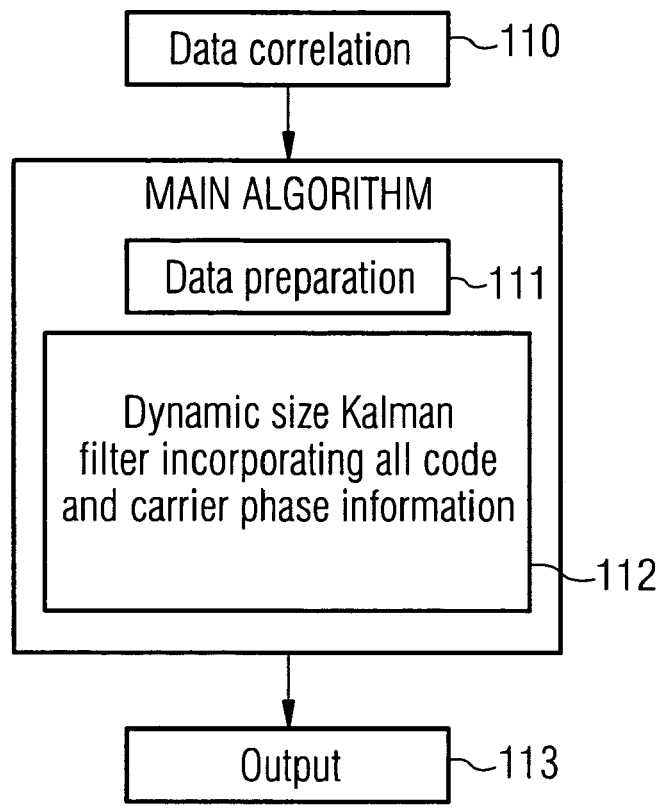
FIG. 2 shows the main stages of an algorithm as used by GPS units of the present invention.

The algorithm used in the control processor 44 has four main stages 110, 111, 112 and 113, as shown in FIG. 2. The majority of the algorithm comprises a dynamically sized Kalman filter 112. Before considering the filter 112, it is necessary to further discuss other parts of the algorithm and the mathematical formulation required.

In order to help achieve the required accuracy, the system works in a Differential GPS (DGPS) mode to provide a time offset measurement. To provide this data, the outputs from the NTTUs 20, 20' are correlated, stage 110, using GPS time data, which is included within the data exchanged over the network 42. At this stage the data from the NTTUs is correlated into data for a same satellite 25 and frequency. The data from any satellites that are not visible to both NTTUs is discarded.

Having collated the data, stage 110, it must be processed, stage 111, to prepare it for input into the Kalman filter stage 112. Key to this, is the concept of 'pseudo-range residual', and 'Accumulated Doppler Range' measurements. The pseudo-range residual is the difference between the measured C/A code pseudo-range and the expected range to the satellite (from ephemeris and pre-surveyed antenna position).

These terms/techniques are well understood by those skilled in the GPS art and a full description of the concepts and equations used for the formulation of the filter may be found in: "Global Positioning System: Theory and Applications" volume I/II, edited by Bradford W Parkinson and James J Spilker Jr., and in "Progress in Astronautics and Aeronautics", Volume 163. A further full description is believed to be unnecessary and accordingly the following brief description only will be given.

The pseudo-range residual $\rho_r$ may be used to determine the timing difference (bA) between the local clock at a first NTTU, (say location 'A') and GPS time directly obtained from GPS data, for example using the civilian L1 frequency code measurements. The carrier-phase information can also be used to measure this offset, and is much more accurate, but includes an unknown, fixed constant which must be determined (the integer ambiguity, NA).

In differential terms, we have an equation for the offset between the two NTTUs (A and B) $\Delta b$ thus:

$\Delta b = b_B - b_A$ (where both $b_B$ and $b_A$ contain terms both due to the antenna/cabling delay and time offset).

As mentioned above, the value of $\Delta b$ can be expressed by functions of the code ($f_1$) and carrier phase ($f_2$) data, giving;

$\Delta b = f_1(\Delta \rho_r) = f_2(\Delta ADR, \Delta N)$, where $\Delta$ indicates location B minus location A.

More specifically:

$$f_1(\Delta \rho_r) = \frac{\overline{\Delta \rho_r}}{c}$$

where c is the speed of light and the bar indicates a weighted average of the individual $\rho_r$.

$$f_2(\Delta ASR, \Delta N) = -\left(\frac{\Delta n}{\gamma} + \frac{\Delta ADR}{\gamma} + \frac{\Delta R}{c}\right),$$

where $\gamma$ is the frequency of the GPS signal and R is the distance from a receiver to the satellite.

In general, the differential pseudo-range residual measurement is a weighted average of the value for each satellite in common view to all NTTUs of a pair, thus always giving only one value (and one instance of the $f_1$ function). The carrier phase data must be repeated for each satellite however, and will give a number of instances of the $f_2$ function, which will change as different satellites come in and out of view.

Considering now the Kalman filter, the basic principles of a Kalman filter are well known, and described in *Kalman Filtering: Theory and Practice* Grewal and Andrews, Prentice-Hall, 1993 amongst other places. Therefore, as in the description above, only a very basic description is given herein.

Figure 3:
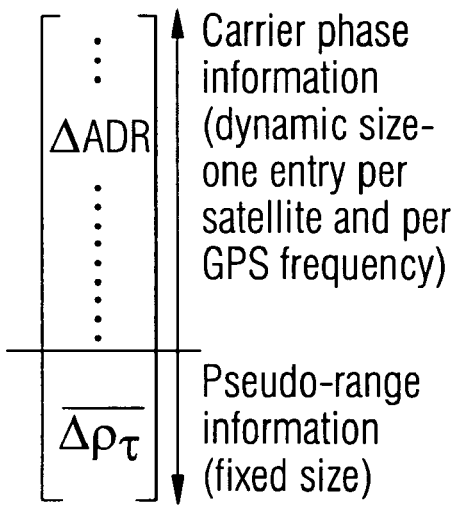
FIGS. 3–4 show respectively the measurement update and state vectors for a Kalman filter as shown in FIG. 2.
Figure 4:
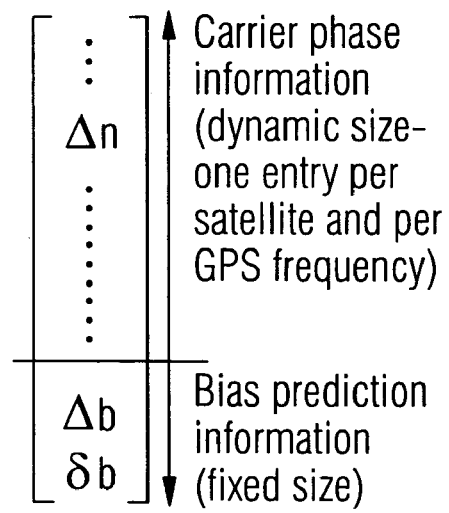

As is apparent from the reference given above, the key to the formulation of a Kalman filter is its state vector and measurement vector which in this case are shown in FIGS. 3–4. The state vector is initialised at start up using $f_1$ and from then on updated at each time interval using the current data in the measurement vector and the normal Kalman Filter update equations. For the purposes of this work, the state vector contains the prediction of time offset between sites, $\Delta b$, the rate of change of this value, $\delta b$, and the integer ambiguity values for the carrier phase information, $\Delta N$ per satellite and GPS frequency. This is shown in FIG. 4. The measurement vector as shown in FIG. 3, contains the information from carrier phase: one Accumulated Doppler Range value per satellite and GPS frequency; and code data: a single weighted average value of the pseudo-range residuals.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Apparatus for providing synchronization of equipment located at a number of mutually remote locations, comprising at each location:
   a disciplined frequency reference;
   a satellite navigation system receiver for providing satellite navigation system data; and
   processing means for receiving satellite navigation system data from the satellite navigation system receiver,
   the apparatus being further provided with a network interconnecting the mutually remote locations,
   characterized in that
   each of the respective processing means is operable to exchange satellite navigation system data with others of said processing means over the network, said respective processing means being employed to calculate a common reference time, based upon the satellite navigation system information received from the associated satellite navigation system receiver and from other locations in the network.

2. Apparatus according to claim 1, wherein the respective processing means are further operable to calculate a common reference timing signal, based upon the calculated common reference time, which is arranged to discipline the respective frequency reference at each location in the network.

3. Apparatus according to claim 1, wherein at least one of the frequency references is operable to provide at least one a frequency output, which may be a one-plus-per-second output.

4. Apparatus according to claim 2, further comprising means for calculating the offset(s) between respective frequency signals, and means for applying corresponding synchronization to the equipment in response to calculated offset(s).

5. Apparatus according to claim 2, wherein each disciplined frequency reference further comprises means for calculating the offset(s) between respective frequency signals, and means for applying a delay to an output signal for compensating the offset(s).

6. Apparatus according to claim 1, wherein one of the disciplined frequency references is denoted as master, the remaining disciplined frequency references are denoted as slave, and the frequency references are operable to adapt the timing of the master as the common time reference.

7. Apparatus according to claim 6 wherein the master disciplined frequency reference is arranged to follow GPS time.

8. Apparatus according to claim 6, arranged to apply a relative delay to the frequency signal of each slave, thereby to bring the timing of each slave into synchronization with the master.

9. A method for providing synchronized timing signals at mutually remote locations, comprising the steps of:
- providing a satellite navigation system receiver at each location;
- providing a frequency reference at each location;
- providing a frequency output signal from each frequency reference;
- providing control circuitry at each location;
- and in the each of a plurality of the mutually remote locations,
- receiving, in the control circuitry, time data from the corresponding satellite navigation system receiver and further sets of time data from at least one other remote locations over a communications network;
- calculating a common reference time based on the received sets of time data; and
- applying a delay to the timing signal of at least one of the locations, thereby bringing the frequency output signals into synchronization.

10. A method according to claim 9, further comprising the steps of:
- appointing one of the locations 'master', and the remainder 'slave';
- delaying the frequency output signals of each slave, to bring such signals into synchronization with a corresponding frequency output signal of the master.

* * * * *